No. 648,714. Patented May 1, 1900.
A. B. TAYLOR.
SKIRT STICK.
(Application filed Mar. 25, 1897.)
(No Model.)

WITNESSES
W. S. Van Loan.

INVENTOR
Anna Bell Taylor
By John Keddenburn
Attorney

THE NORRIS PETERS CO., PHOTO-LITHO., WASHINGTON, D. C.

UNITED STATES PATENT OFFICE.

ANNA BELL TAYLOR, OF GOSHEN, INDIANA.

SKIRT-STICK.

SPECIFICATION forming part of Letters Patent No. 648,714, dated May 1, 1900.

Application filed March 25, 1897. Serial No. 629,111. (No model.)

*To all whom it may concern:*

Be it known that I, ANNA BELL TAYLOR, of Goshen, in the county of Elkhart and State of Indiana, have invented certain new and useful Improvements in Tailors' Skirt-Sticks; and I do hereby declare the following to be a full, clear, and exact description of the invention, such as will enable others skilled in the art to which it appertains to make and use the same.

This invention relates to a skirt stick or rule for laying off gores of skirts or patterns for the gores of skirts.

The object of the invention is to provide a rule whereby any one may be enabled to lay off the gores of ladies' skirts so as to produce a perfect fit for all sizes and styles of skirts.

The invention consists in a skirt-stick having a long main graduated length measure for regulating the length of the skirt at different points of its circumference, and a waist-arm and a hip-arm arranged at about right angles with the length measure, both arms being graduated to measure the proper width and divergence of a predetermined fractional part or gore of a skirt.

In the accompanying drawings, forming part of this specification, Figure 1 is a perspective of the stick as ready for use. Fig. 2 is also a perspective of the stick as folded up for compactness. Fig. 3 is an enlarged detail perspective of a brace for holding the parts of the hinged length measure extended when in use. Fig. 4 is a perspective of the stick folded, showing the side opposite that shown in Fig. 2.

1 is the length measure, for convenience graduated on opposite sides.

2 is the waist-arm, and 3 the hip-arm. The waist-arm is arranged at the upper end of the length measure and the hip-arm is arranged about six inches below the waist-arm, and normally or when in use they are at right angles with the length measure. The arms are graduated to measure the proper width and divergence of a predetermined fractional part or gore of a skirt, and in the present instance I have provided each arm with two varying graduations, the waist-arm having graduations 10 and 11 and the hip-arm graduated scales 13 and 14. The graduations 10 and 13 on the upper side of the arms are on a scale of one-eighth of an inch, and the gore is to be laid off by these scales when the skirt is to be made with what is called a "front" gore and three side gores, or four gores on each side, each being one-eighth of the distance from center front to center back. One back gore is then added, which forms the plait. The graduations on the lower side of the arms are on a scale of one-sixth of an inch, and the measurements are to be taken from such graduations when the skirt is to be formed with a front and two side gores, or altogether three side gores and a back in a well-known way. In this case the three gores will extend the exact distance from center front to center back. The back gore, which forms the plait, will complete the skirt. For laying off the back gore I provide the rear side of the waist and hip arms with graduations 12 and 15, the lower numbers of the graduations being used for small sizes, the next higher numbers for medium, and the largest numbers for large sizes. In order to get the proper curve from waist to hip for the gores, I give the upper end of the section 5 of the length measure a curve, as shown at 9.

In order that the stick may be folded and brought into compact condition, I make the length measure in two or more parts or sections, as 5 and 6, and hinge them together and pivot the waist and hip arms to the side of the measure, so that they may be folded alongside and arranged longitudinally with said measure.

4 is a brace or keeper for holding the sections 5 and 6 rigidly in extended position when the device is in use. The brace 4 is conveniently made by bending a strip of metal or wire into the form shown in Fig. 3, having the bars 16 16 and connecting-bar 17 so bent as to just fit and clamp the sections of the measure and hold them in extended position.

In the use of my improved skirt-stick I first take the waist measure tight and the hip measure rather loose and then take the length measure at frequent intervals entirely around the person. For laying off the front gore double the lining lengthwise, lay on a table with fold toward the operator, take stick with top toward the left and curving side from you, then place the number representing the waist measure on the upper edge of waist-arm and number representing hip measure on upper edge of hip-arm on the fold in the fabric, and then draw a line across the top of the waist-arm down the curving side to the number on the stick representing the length of the skirt. To lay off side gores, spread lining or fabric full width on table, next place skirt-stick with the curved side toward you straight on the selvage, draw line along curving side and line across the upper edge of waist-arm, then turn the stick with curved side away from you and place the numbers representing the waist and hip measures on the arms a half-inch back from the front side, and then draw line down the curving side of the stick to the proper length of the skirt, the allowance of half-inch being for seam. For laying off the back gore first place the stick on front edge of goods with arms turned from you and draw a line across the upper edge of waist-arm, then turn stick straight edge from you and place corresponding numbers on the back side of the arms on straight line, and finally draw a line down the straight edge of the stick to the length of the skirt.

Having described my invention, what I claim as new, and desire to secure by Letters Patent, is—

1. A skirt-stick consisting of a graduated length measure, a waist-arm pivoted to the upper end of the length measure, a hip-arm arranged below the waist-arm, both arms having a plurality of graduations on one side and a single graduation on the other side to lay off gores of different fractional parts of a skirt to correspond with varying styles or fashions.

2. A skirt-stick consisting of a graduated length measure, a waist-arm pivoted to the upper end of the length measure, a hip-arm arranged below the waist-arm, both arms being graduated on opposite sides to measure the proper width or divergence of fractional parts of a skirt and for laying off a back gore, substantially as described.

3. A skirt-stick consisting of a graduated length measure, having a curve at its upper end, a waist-arm connected with the measure at the upper end, a hip-arm connected with said measure about six inches from the waist-arm, the arms being graduated as described to measure the proper width and divergence of fractional parts or gores of a skirt, substantially as described.

In testimony whereof I have signed this specification in the presence of two subscribing witnesses.

ANNA BELL TAYLOR.

Witnesses:
A. S. ZOOK,
THOMAS W. ROACH.